United States Patent
Chiang et al.

(10) Patent No.: US 9,599,805 B2
(45) Date of Patent: Mar. 21, 2017

(54) OPTICAL IMAGING SYSTEM USING STRUCTURED ILLUMINATION

(75) Inventors: Su Yu Chiang, Hsinchu (TW); Bo Jui Chang, Hsinchu (TW); Jih Young Yuh, Hsinchu (TW); Li Jun Chou, Hsinchu (TW)

(73) Assignee: NATIONAL SYNCHROTRON RADIATION RESEARCH CENTER, Hsinchu (TW)

( * ) Notice: Subject to any disclaimer, the term of this patent is extended or adjusted under 35 U.S.C. 154(b) by 1290 days.

(21) Appl. No.: 13/408,803

(22) Filed: Feb. 29, 2012

(65) Prior Publication Data
US 2013/0100525 A1    Apr. 25, 2013

Related U.S. Application Data

(60) Provisional application No. 61/548,894, filed on Oct. 19, 2011.

(51) Int. Cl.
*G02B 21/08* (2006.01)
*G02B 21/14* (2006.01)
(Continued)

(52) U.S. Cl.
CPC ........... *G02B 21/082* (2013.01); *G02B 21/14* (2013.01); *G02B 27/48* (2013.01); *G02B 27/58* (2013.01)

(58) Field of Classification Search
CPC ...... G02B 21/082; G02B 21/14; G02B 27/48; G02B 27/58
(Continued)

(56) References Cited

U.S. PATENT DOCUMENTS 5,633,714 A * 5/1997 Nyyssonen ............ G01B 11/00
356/497
2005/0207160 A1* 9/2005 Babayoff ........... G02B 21/0032
362/259
(Continued)

FOREIGN PATENT DOCUMENTS

CN        102216827       10/2011
DE    102008034137 A1    4/2009
(Continued)

OTHER PUBLICATIONS

Taiwan search report for Taiwan patent application 101134082, issued on Jul. 22, 2014.
(Continued)

*Primary Examiner* — Bumsuk Won
*Assistant Examiner* — Wen Huang
(74) *Attorney, Agent, or Firm* — Ming Chow; Sinorica, LLC

(57) ABSTRACT

The present invention discloses an optical system to generate incoherent structured illumination and an optical imaging system using incoherent structured illumination. The optical system includes: at least one coherent light source, a spatial light modulator, a plurality of optical lenses, a rotating diffuser for destroying the coherence of the structured illumination pattern, an objective, and a stage accommodating samples. The optical imaging system using incoherent structured illumination includes: an optical microscope having an objective and a beam splitter, a charge-coupled device camera for recording a sequence of images of the samples, a stage for accommodating and moving samples; a coherent light source; a spatial light modulator; a quarter wave plate, a plurality of optical lenses and mirrors; and a diffuser rotating 360 degrees or vibrating rapidly around the axis of the optical path continuously.

27 Claims, 12 Drawing Sheets

(51) Int. Cl.
*G02B 27/48* (2006.01)
*G02B 27/58* (2006.01)

(58) Field of Classification Search
USPC .............................. 359/385, 386, 388, 368
See application file for complete search history.

(56) References Cited

U.S. PATENT DOCUMENTS

| | | | |
|---|---|---|---|
| 2007/0274075 A1 | 11/2007 | Nagamune | |
| 2008/0180679 A1* | 7/2008 | de Groot | G01B 9/02004 356/450 |
| 2009/0268280 A1* | 10/2009 | Osawa | G02B 21/0032 359/363 |
| 2011/0109962 A1 | 5/2011 | Cui et al. | |
| 2011/0122416 A1 | 5/2011 | Yang et al. | |
| 2011/0141483 A1 | 6/2011 | Lee | |
| 2012/0257197 A1 | 10/2012 | Feldkhun et al. | |

FOREIGN PATENT DOCUMENTS

| | | |
|---|---|---|
| DE | 102007055530 A1 | 5/2009 |
| EP | 1510851 | 3/2005 |
| JP | 3107388 | 2/2005 |
| JP | WO2007/043314 A1 | 4/2007 |
| JP | 2007-233371 A | 9/2007 |
| JP | 2011-514532 A | 5/2011 |
| WO | WO 2006/058187 A2 | 6/2006 |
| WO | WO2009/115108 A1 | 9/2009 |
| WO | WO 2011/072175 A2 | 6/2011 |
| WO | WO 2012/050901 A2 | 4/2012 |
| WO | WO 2012/072290 A1 | 6/2012 |
| WO | WO 2012/135823 A1 | 10/2012 |
| WO | WO 2012/168293 A2 | 12/2012 |

OTHER PUBLICATIONS

B.-J. Chang, L.-J. Chou, Y.-C. Chang, S.-Y. Chiang, "Isotropic image in structured illumination microscopy patterned with a spatial light modulator" Opt. Express (2009), pp. 14710-14721, vol. 17.

B.-J. Chang, S. H. Lin, L.-J. Chou, S.-Y. Chiang, "Subdiffraction scattered light imaging of gold nanoparticles using structured illumination" Opt. Lett. (2011), pp. 4773-4775, vol. 36.

M. G. L. Gustafsson, L. Shao, P. M. Carlton, C. J. R. Wang, I. N. Golubovskaya, W. Z. Cande, D. A. Agard, J. W. Sedat, "Three-Dimensional Resolution Doubling in Wide-Field Fluorescence Microscopy by Structured illumination" Biophys. J. (2008), pp. 4957-4970, vol. 94.

L. M. Hirvonen, K. Wicker, O. Mandula, R. Heintzmann, "Structured illumination microscopy of a living cell" Eur. Biophys. J. (2009), pp. 807-812, vol. 38.

P. Kner, B. B. Chhun, E. R. Griffis, L. Winoto, and M. G. L. Gustafsson, "Super-resolution video microscopy of live cells by structured illumination," Nat. Methods.(2009) , pp. 339-342 ,vol. 6.

11. C.-C. Wang, K.-L. Lee, and C.-H. Lee, "Wide-field optical nanoprofilometry using structured illumination" Opt. Lett. (2009), pp. 3538-3540, vol. 34.

German Patent and Trademark Office, Office Action, issued on Mar. 25, 2013, received on Mar. 28, 2013.

Japanese Office Action for Japanese patent application No. 2012-222014.

* cited by examiner

OPTICAL IMAGING SYSTEM USING STRUCTURED ILLUMINATION

The current application claims a priority to U.S. 61/548,894 filed on Oct. 19, 2011.

BACKGROUND OF THE INVENTION

1. Technical Field

The present invention relates to an optical imaging system using incoherent structured illumination, and more particularly, to a sub-diffraction scattered light imaging system using incoherent structured illumination.

2. Background

Fluorescent microscopy (FM) is known for its high sensitivity, high molecular discrimination, and simultaneous multicolor imaging capability, and is therefore a crucial tool for studying the fine structures of cells and organisms through fluorescent labeling. However, FM has two major weaknesses: the photo-bleaching of fluorescent dye and the insufficient spatial resolution of fluorescent images due to diffraction limit. Conventional wide-field FM provides a lateral resolution of from 220 to 300 nm and an axial resolution of from 800 to 1000 nm. Confocal laser scanning fluorescent microscopy increases the axial resolution from 400 to 500 nm and provides three dimensional (3D) sectioning images, but the increase of the lateral resolution is limited. In recent years, structured illumination microscopy (SIM) utilizes a structured light pattern to illuminate samples in order to break the diffraction limit to achieve a doubled resolution in fluorescence images.

As one application, three-dimensional structured illumination fluorescence microscopy (3D-SIFM) utilizes three diffracted laser beams to generate a 3D interference pattern for sample illumination, and accordingly transfers the high spatial frequency image data to be covered by the scope of the optical transfer function (OTF) of a wide-field microscope. The high frequency image data under irradiation at various pattern orientations are collected and processed by the image reconstruction algorithm to retrieve a high-resolution fluorescence image according to Gustafsson et al. 3D-SIFM is now able to provide twice as much resolution in both lateral and axial directions with true optical sectioning as compared to the conventional wide-field fluorescence microscopy.

SIM-based techniques are widely applied to the measurement of fluorescent light, but not frequently used in the measurement of scattered light from samples. Scattered light imaging can image transparent and label-free specimens of strong scattering in their native environment. The increasing importance of noble metal nanoparticles in biological and biomedical applications further makes scattered light imaging an attractive modality to investigate the behavior and interactions at the sub-cell level. Apart from having excellent biocompatibility and stability, noble metal nanoparticles feature a strong ability to scatter light and resistance to photobleaching.

The adoption of 3D-SIM to scattered light imaging is complicated. In 3D-SIFM, a coherent or partially coherent light source is used to generate a 3D interference pattern with high modulation contrast. Because the fluorescent light emitted from a sample is incoherent, studied equations and procedures for incoherent imaging can be followed to retrieve a high resolution image. In contrast, light scattered from a sample is a coherent process. With a coherent light source, the known mathematical modality for fluorescence image reconstruction is unsuitable. New coherent image retrieving procedures are required but the complexity in mathematical derivation prohibits advancement in the technology. Additionally, scattered light imaging suffers from the interference of reflected light generated at interfaces of different materials due to no emission filter to block the incident light. Although a dark-field scheme adds a mask to block the reflected light, this design unavoidably reduces the intensity of the scattered light and degrades the image resolution.

FIG. 1 shows a conventional optical system for 3D structured illumination 10. A coherent light beam is outputted by a coherent light source 11 and is received by a spatial light modulator (SLM) 12 positioned on the optical path created by the coherent light source 11. The SLM 12 then diffracts the single inputting light beam into a plurality of higher order beams, for example, 0, +1, and −1 order diffracted beams, as shown in FIG. 1. In order to converge the parallel diffracted beams, the convex lens $L_1$ is positioned at a distance $f_1$ from the SLM 12, wherein $f_1$ is the focal length of the convex lens $L_1$.

The parallel beams passing through lens $L_1$ are converged and then diverged to enter convex lens $L_2$. Lens $L_2$ is positioned at a distance $f_2$ from the convergent points and produces parallel beams which intersect each other, wherein the distance $f_2$ is the focal length of the lens $L_2$. The structured pattern is formed at a conjugate image plane 16, or a Fourier plane, at the distance $f_2$ away from the lens $L_2$. A convex lens $L_3$ is positioned at a distance $f_3$ away from the conjugate image plane 16, receiving the parallel beams and producing three converging beams toward objective lens $L_{obj}$. The depiction of the objective lens $L_{obj}$ in FIG. 1 is rather a high-level presentation, practically a set of lenses are arranged in the objective 17. The distance between the objective lens $L_{obj}$ and the lens $L_3$ is the sum of $f_3$ and $f_{obj}$, wherein $f_3$ is the focal length of the lens $L_3$, and $f_{obj}$ is the focal length of the objective lens $L_{obj}$, respectively. In particular, $f_3$ is the distance between the lens $L_3$ and the back focal plane 16' of the objective lens $L_{obj}$; whereas $f_{obj}$ is the distance between the objective lens $L_{obj}$ and its back focal plane 16'. In the case where a set of lenses are arranged in the objective 17, the $f_{obj}$ is the effective focal length of the set of lenses. Three parallel beams passing through the objective lens $L_{obj}$ then intersect each other at another image plane where a stage 15 accommodating a sample is positioned. The intersection of three parallel coherent beams produces a 3D structured pattern at the stage 15 where a sample having virtual thickness can be imaged in a sectioning fashion to reconstruct its 3D image.

FIG. 2 shows an optical imaging system 20 for 3D structured illumination. The combination of the coherent light source 21, the SLM 22, the stage 25, the objective 27, and a set of optical lenses ($L_1'$, $L_2'$, $L_3'$, $L_4'$, $L_5'$, $L_{obj}'$) is substantially identical to the optical system shown in FIG. 1 with only a minor variation of the lens arrangement for the sake of experimental convenience. An adjustable mask 23 is positioned on or off the optical path to selectively filter the diffracted beams. The use of the mask 23 also adds versatility to the structured illumination optical system, for the system to operate in a wide-field (preserve only the 0 order diffracted beam) or a 2D structured pattern illumination (preserve only the +1 and −1 order diffracted beam) mode. The mask 23 depicted in FIG. 2 is positioned off the optical path, therefore no diffracted beam is blocked. A charge-coupled device (CCD) camera 24 is placed at a position suitable for receiving fluorescent light emitting from the sample, and a real space image can be reconstructed based on the signal received by the CCD camera 24.

The present invention is the first to combine 3D-SIM and scattered light imaging, successfully generating 3D incoherent structured illumination to avoid speckle scattering and complicated coherent image retrieval. A reflective light scattering microscope with 3D structured illumination (SI-RLSM) is disclosed in the present invention, and a lateral/axial resolution of 120 nm/430 nm is demonstrated based on the high-resolution SI-RLS image of 100 nm noble metal nanoparticles. The present invention can be applied to detect noble metal nanoparticles or strong scatters in biological specimens to provide high resolution and high contrast 3D scattered light images.

SUMMARY

One aspect of the present invention discloses an optical system generating incoherent structured illumination, comprising: a coherent light source outputting coherent light which forms an optical path; a spatial light modulator positioned on the optical path and receiving the coherent light, wherein the patterns of the spatial light modulator are designed to generate a plurality of diffracted coherent light beams at a selected phase and orientation; a plurality of optical lenses positioned on the optical path and forming at least one image plane where the plurality of diffracted coherent light beams intersect to form a structured pattern; a rotating or vibrating diffuser positioned on one of the conjugate image planes, configured to destroy the coherence of the diffracted coherent light beams; an objective receiving the plurality of diffracted light beams with destroyed coherence; and a stage in proximity to the objective, accommodating a sample and positioned near the front focal plane of the objective.

Another aspect of the present invention discloses an optical imaging system using incoherent structured illumination, comprising an optical microscope which includes an objective having a first side in proximity to a sample and a second side far from the sample; a stage placed at the first side of the objective, configured to be moved in a direction toward or away from the objective and to accommodate the sample at the surface of the stage close to the objective; a 50/50 beam splitter placed on the optical path to reflect the incident light beams on the second side of the objective and to transmit scattered light from the sample to an imaging recoding device; a coherent light source emitting coherent light which forms an optical path passing through the objective; a spatial light modulator positioned on the optical path and configured to generate a structured pattern of the coherent light at the focal plane of the objective; a plurality of optical lenses and mirrors disposed on the optical path, wherein at least one conjugate image plane of the structured pattern is formed on the optical path; and a rotating diffuser configured to destroy the coherence of the coherent light, disposed on the at least one conjugate image plane.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention are illustrated with the following description and upon reference to the accompanying drawings in which.

DETAILED DESCRIPTION

The structured illumination reflective light scattering microscope (SI-RLSM) disclosed in the present invention utilizes an SLM to quickly and accurately change the orientation, contrast, and phase of the structured pattern, and with the placement of a rotating diffuser exactly at the Fourier plane to effectively destroy the coherence of the structured pattern at another downstream Fourier plane where a sample resides. The present disclosure makes use of the mathematical algorithm for incoherent image reconstruction proposed by M. G. L. Gustafsson et al. to reconstruct SI-RLS images. The rotating diffuser disposed at the Fourier plane averages out the phase distribution and transforms the image reconstruction algorithm from the complex coherent processes to the simple incoherent processes. The appropriate application of a simulated 3D optical transfer function (OTF) of the SI-RLSM in the present invention further improves resolution.

Figure 1:
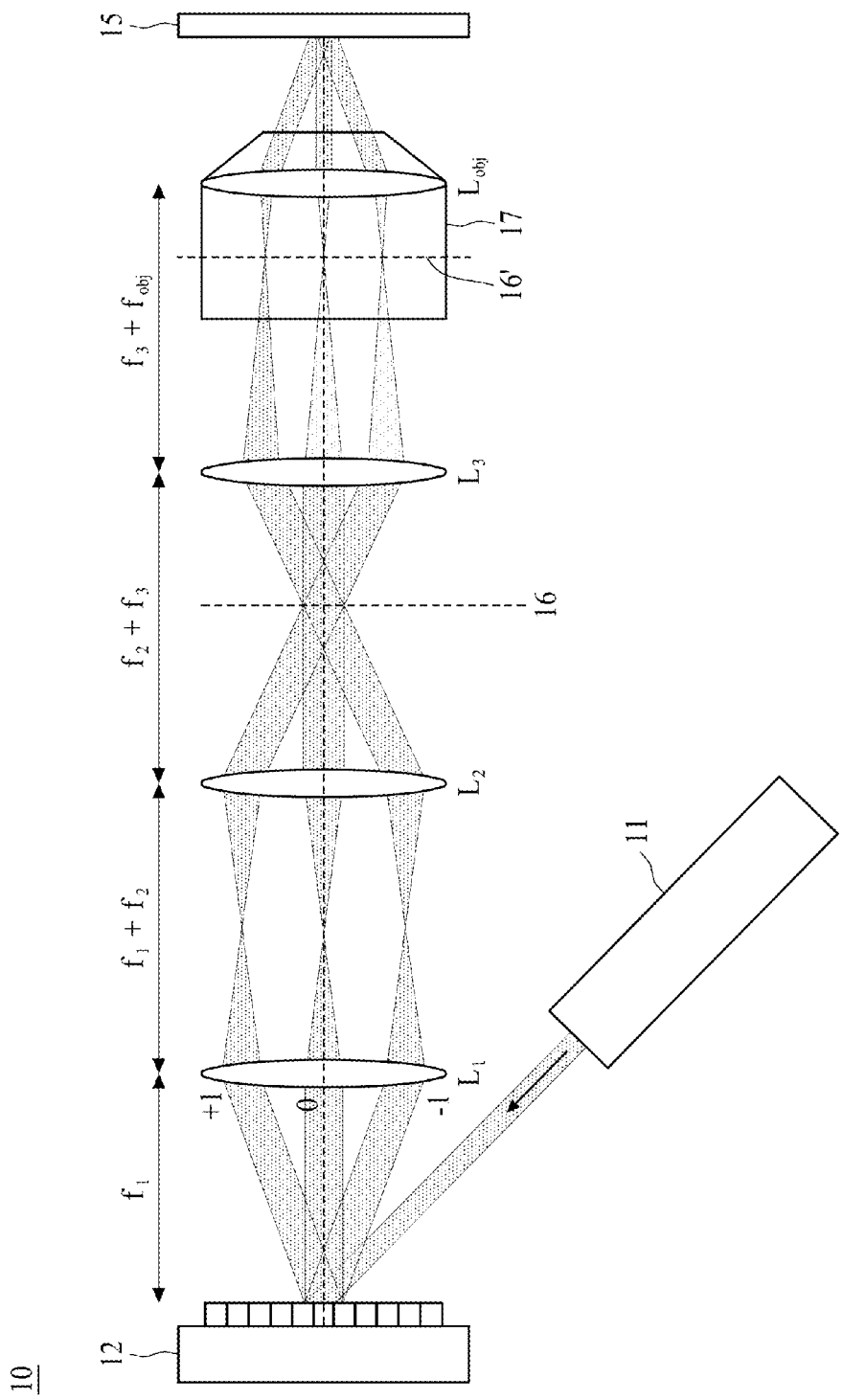
FIG. 1 illustrates an optical system for structured illumination.
Figure 2:
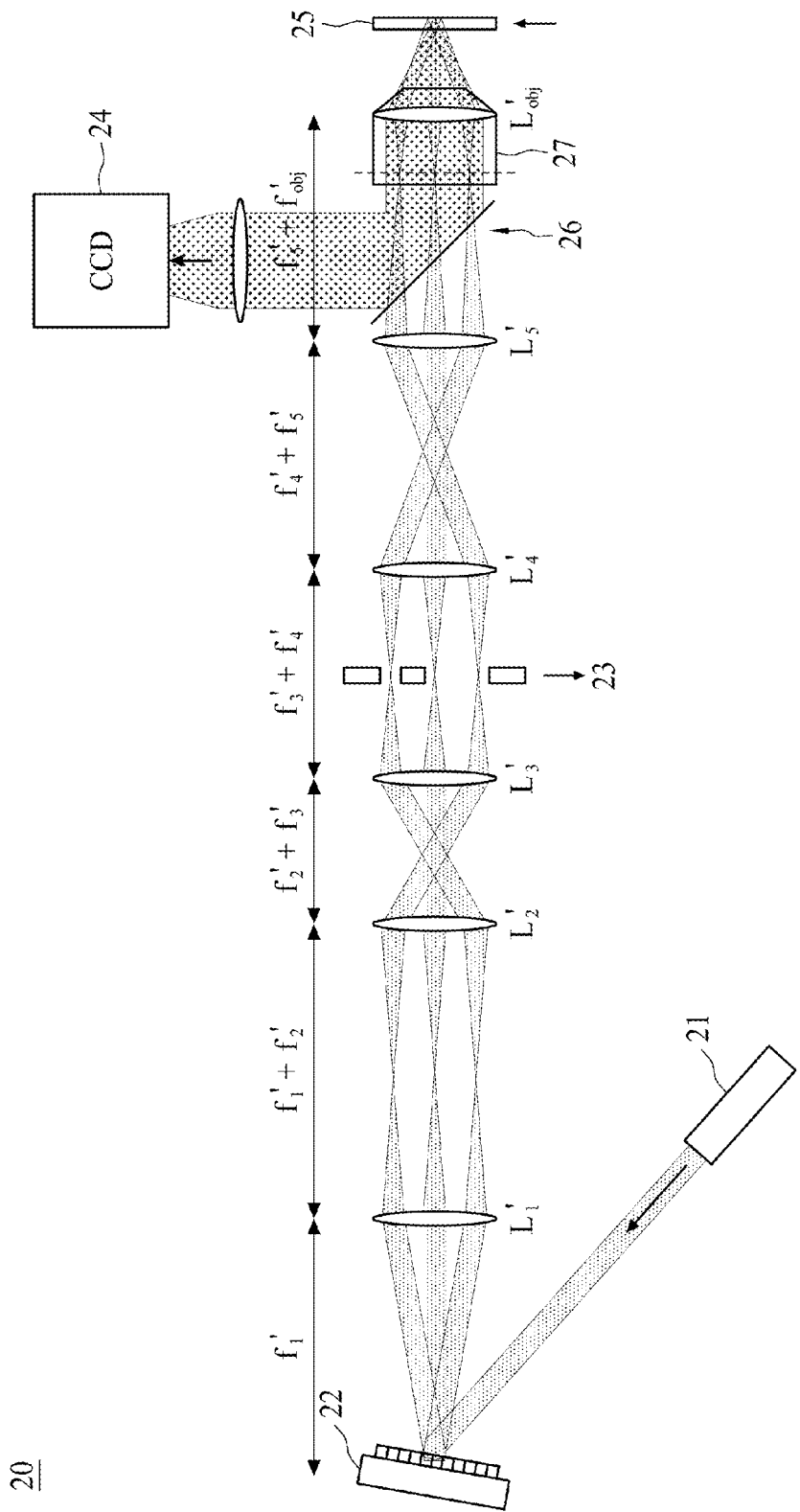
FIG. 2 illustrates an optical imaging system for structured illumination.
Figure 3:
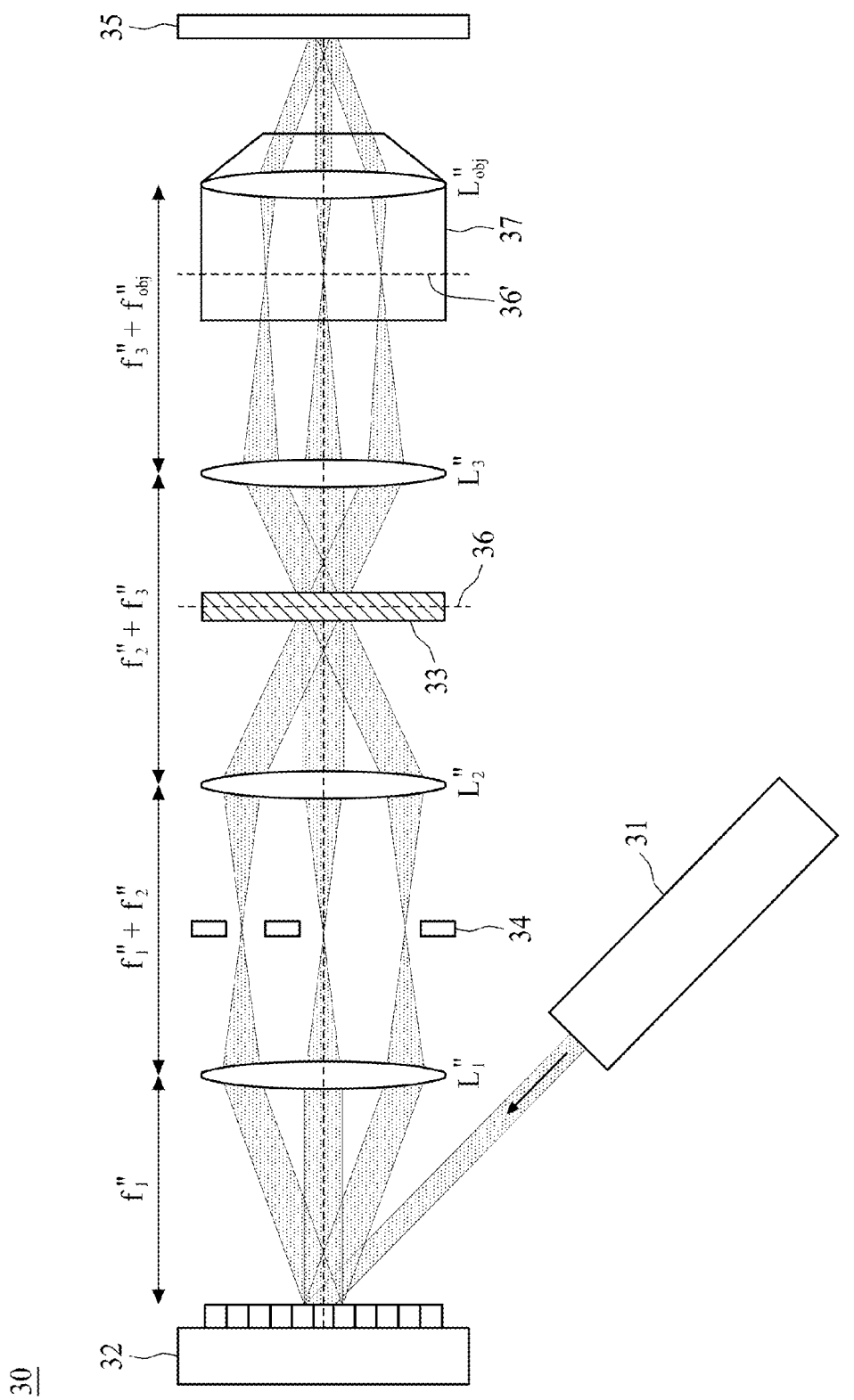
FIG. 3 depicts an optical system to effectively destroy light coherence according to one embodiment of the present invention.

FIG. 3 shows an optical system 30 that effectively destroys light coherence according to one embodiment of the present invention. The optical elements such as a coherent light source 31, an SLM 32, a stage 35 holding samples, an objective 37, and a set of optical lenses ($L_1''$, $L_2''$, $L_3''$, $L_{obj}''$) are arranged in the same fashion as that in the conventional optical system 10 shown in FIG. 1. The system shown in FIG. 3 is characterized by the placement of a rotating holographic diffuser 33 at the conjugate image plane 36, or the Fourier plane, of the system. Since the desired effect of the present invention is to create a 3D structured illumination pattern at the downstream image plane where the sample-carrying stage 35 resides, and at the same time reduce the coherence of the structured light illuminating on the sample, a rotating holographic diffuser 33 placed at the position depicted can simultaneously satisfy the two seemingly contradictory goals. The optical system 30 of FIG. 3, wherein the set of optical lenses are arranged in specific positions such that the +1 and −1 order diffracted beams from the spatial light modulator are close to the edge of the objective lens $L_{obj}''$ and the diffracted beams are focused on the back focal plane 36' of the objective lens $L_{obj}''$.

FIG. 3 shows another embodiment of the present invention including an optical system similar to that described above but with an additional mask 34 to generate a wide-field or a 2D structured illumination pattern. The mask can be adjusted to block the +1 and −1 order diffracted beams, such that a wide-field image would be presented at the image plane; the mask can also be adjusted to block the 0 order diffracted beams, such that the structured pattern formed at the image plane where the sample resides can be a 2D pattern, that is, only on the plane parallel to the surface of the stage 35.

Figure 4:
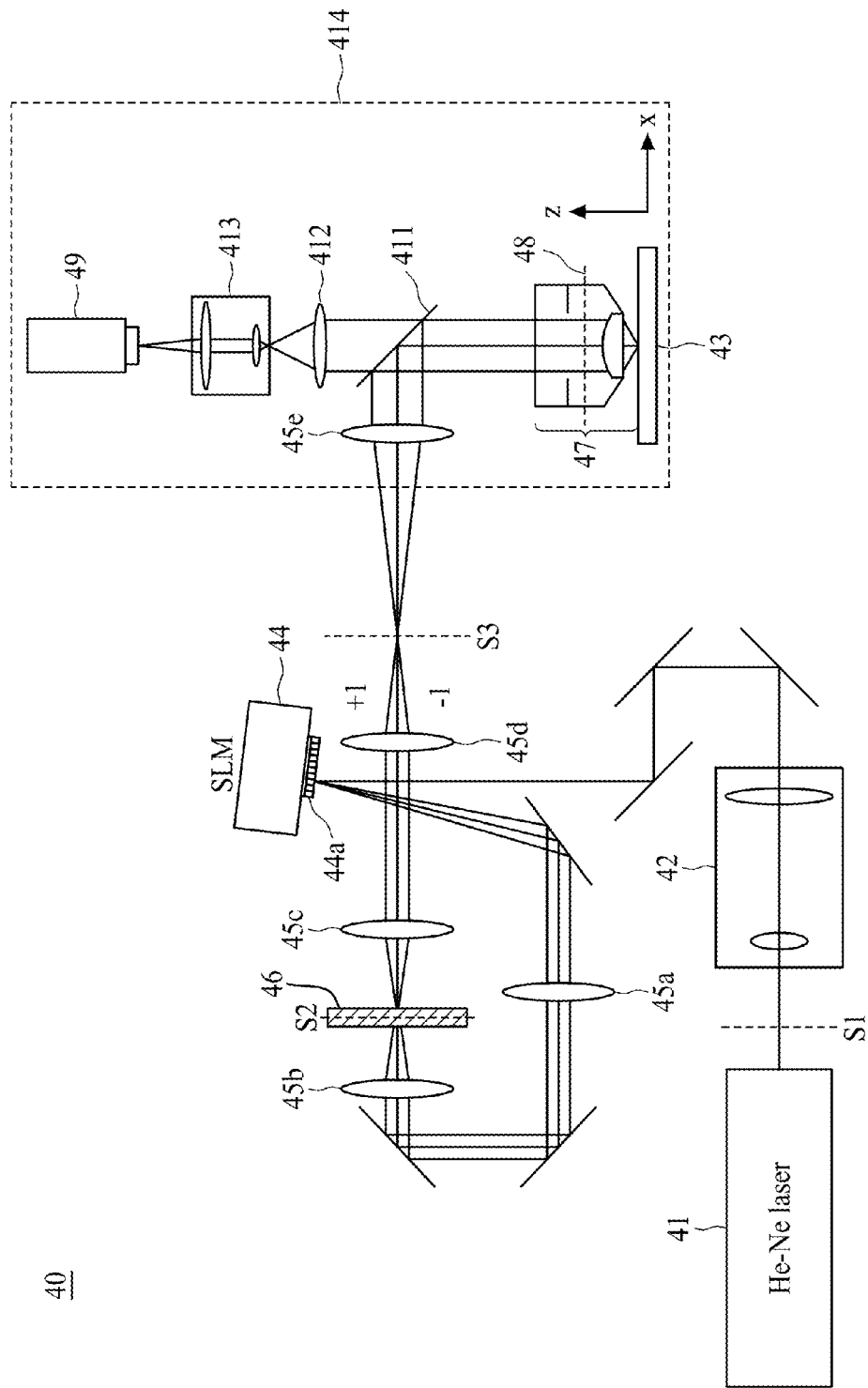
FIG. 4 depicts an optical imaging system to effectively destroy light coherence according to one embodiment of the present invention.

FIG. 4 depicts an optical imaging system 40 according to one embodiment of the present invention. The system 40 is tailored for SI-RLS imaging and is equipped with optical elements described below. A coherent light source, for example, a He—Ne laser 41 operating at 543 nm, emits coherent light which forms an optical path. The coherent light is expanded by passing through a 10× beam expander 42 and diffracted with a phase-only SLM 44 into laser beams of 0, +1, and −1 orders. The laser beams are then focused with five lenses (45a, 45b, 45c, 45d, 45e) in a set, passing through a 50/50 beam splitter 411, on to the back focal plane 48 of an objective 47, wherein the lens 45e can be positioned inside the optical microscope 414.

In the optical imaging system 40 of FIG. 4, the set of optical lenses are arranged in specific positions such that the +1 and −1 order diffracted beams from the spatial light modulator are close to the edge of the objective 47 and the diffracted beams are focused on the back focal plane 48 of the objective 47. The light scattered from the sample positioned on the stage 43 is collected by the objective 47 and then passes through a 50/50 beam splitter 411, a tube lens 412 and a 2× relay lens 413, and is detected with an electron-multiplying CCD camera 49. In one embodiment of the present invention, an upright optical microscope 414 comprises the lens 45e, the beam splitter 411, the tube lens 412, the 2× relay lens 413, the objective 47, the stage 43, and the CCD 49. The stage 43 is controlled by a piezoelectric transducer (PZT) for stepping the sample toward or away from the objective 47, in order to obtain the sectioning images along the z direction.

In FIG. 4, three positions on the optical path are marked with S1, S2, and S3. The rotating holographic diffuser 46 in the present embodiment is positioned at S2 instead of S1 for the following reason. If the diffuser 46 is disposed at S1, the light coherence is partially destroyed immediately upon exiting the coherent He—Ne laser 41. Because the partially coherent light retains some degree of coherence, three diffracted light beams of partial coherence can intersect to generate a structured illumination pattern at the focal plane where samples reside. On the other hand, each point in one of the three incoherent diffracted beams, along with the corresponding point in the other two incoherent diffracted beams, are considered coherent, therefore coherent point triplets are formed. A structured illumination pattern can also be formed from an incoherent superposition of the coherent point triplets. To sum up, the structured pattern generated with the diffuser positioning at S1 is a superposition of the incoherent and coherent portion of the three diffracted light beams.

If the diffuser is positioned at S2 shown in FIG. 4, the light coherence is destroyed effectively to lead to a nearly complete incoherent illumination. S2 is at the conjugate image plane where three diffracted beams intersect to form a structured illumination pattern. Therefore, not only the coherence of the structured pattern is greatly reduced, but also the incoherent structured illumination pattern can be imaged at the image plane where samples reside.

If the diffuser is positioned at S3 of FIG. 4, a similar structured illumination pattern can be observed as if the diffuser is positioned at S2. In another embodiment of the present invention, more than one diffuser is instrumented in the optical system. For instance, in an optical system with two diffusers, one diffuser is positioned at S2 and the other diffuser at S3, a similar structured illumination pattern could still be formed, but with a much weaker intensity.

Figure 5:
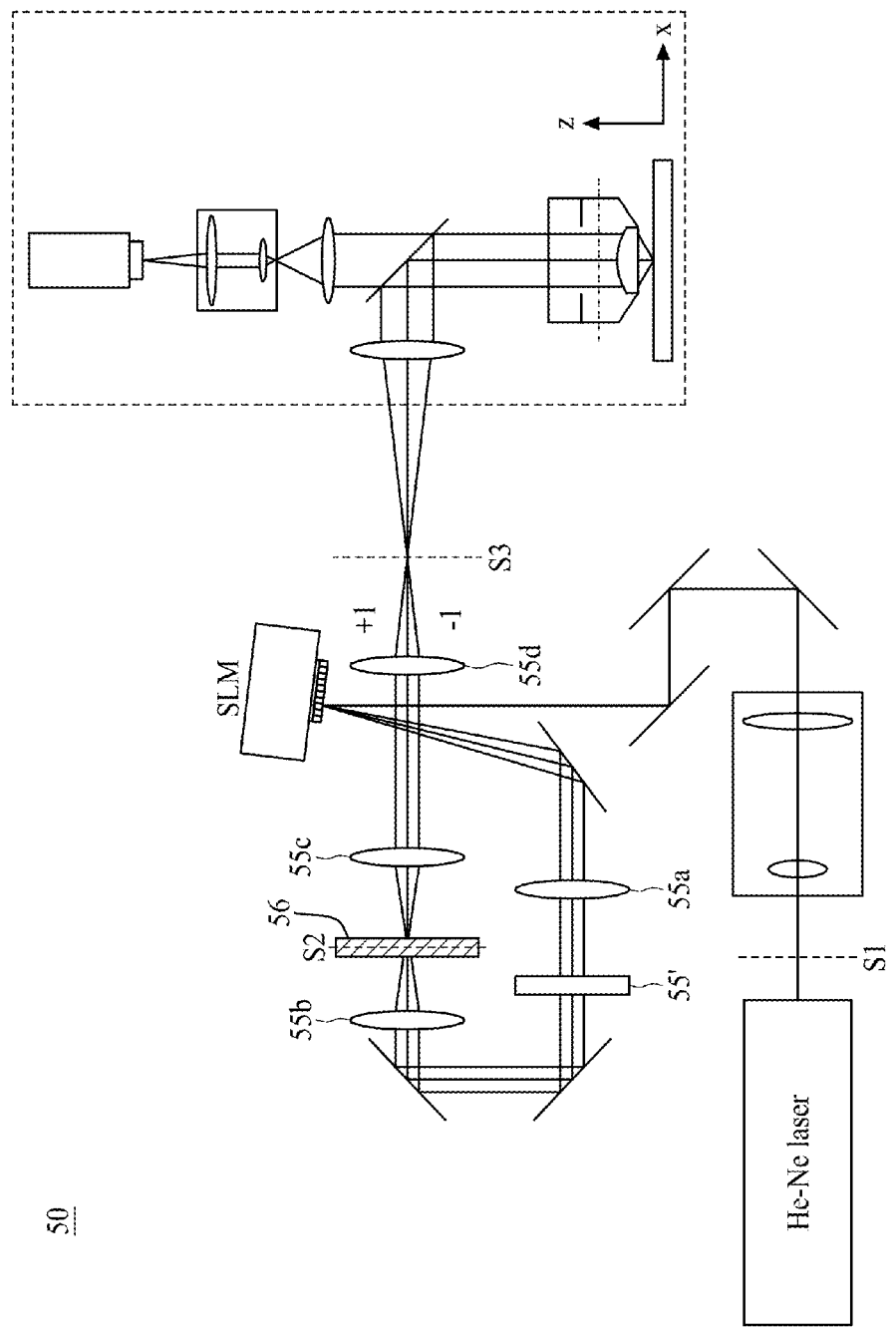
FIG. 5 depicts an optical imaging system to effectively destroy light coherence according to one embodiment of the present invention.

FIG. 5 depicts an optical imaging system 50 according to one embodiment of the present invention. Compare to the optical system 40, the optical imaging system 50 further comprising a quarter wave plate 55', positioned between the lenses 55a and 55b. The quarter wave plate 55' is configured to produce circularly polarized light in order to generate the illumination patterns at different orientations with nearly the same contrast.

In one embodiment of the present invention, a rotating holographic diffuser is used. In another embodiment of the present invention, a rotating plate having a roughened surface or an optical coating at the surface is used. In another embodiment of the present invention, a rotating ground glass is used as a diffuser. In another embodiment of the present invention, a vibrating plate having a roughened surface or an optical coating at the surface is used. All the diffusers or processed plates listed above have common characteristics in that they are transparent to the impinging light and they rapidly rotate or vibrate around the axis of the optical path. Because a diffuser imposes a random phase change on the incident light, the rotation or vibration movement is maintained, preferably under a constant rate, in order to average out the phase contribution in the mathematical expression for imaging.

In one embodiment of the present invention, the amplitude of scattered signals on the CCD plane $U_i(x,y,t)$ can be described as $$U_i(x,y,t) = U_g(x,y,t) \otimes h(x,y) = [\sqrt{S(x,y)} \cdot E(x,y) \cdot e^{i\phi(t)}] \otimes h(x,y),$$

in which the distribution of scattered signals on the sample plane is represented by $U_g(x,y,t)$, the coherent point spread function (PSF) is represented by h(x,y), the reflective intensity in the image of noble metal nanoparticles is represented by S(x,y), the amplitude of the illuminating light is represented by E(x,y), and phase distribution induced by a rotating diffuser is represented by $\phi(t)$. As the diffuser rotates rapidly during the exposure for imaging, the time average of $\phi(t)$ is zero. The detected signal $I_i(x,y)$ is thus the temporal average of the intensity of the scattered signals, $$I_i(x,y) = \langle |U_i(x,y,t)|^2 \rangle = [S(x,y)|E(x,y)|^2] \otimes |h(x,y)|^2.$$

This equation corresponds to an incoherent image, consistent with the experimental observation in the present embodiment.

Figure 6:
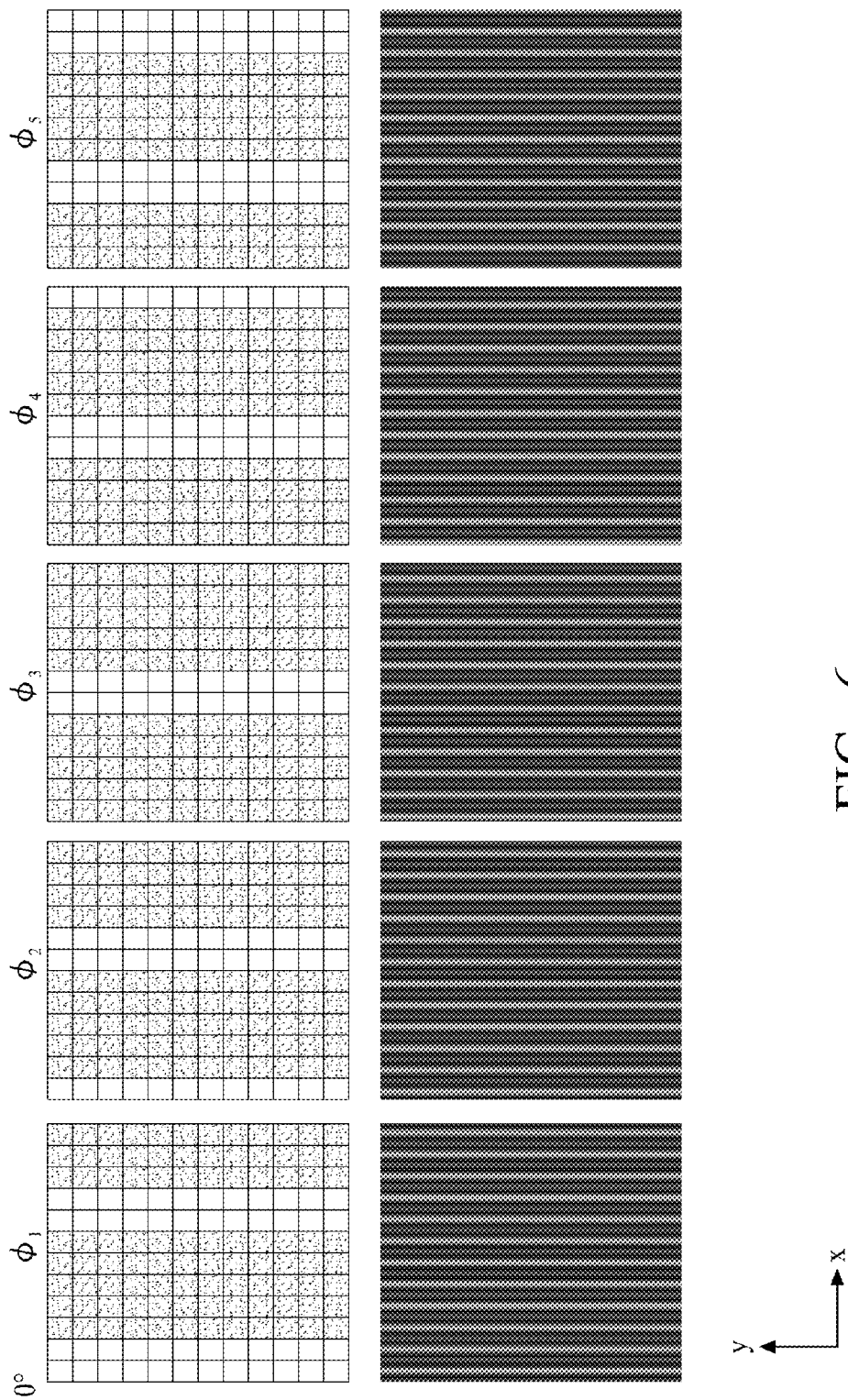
FIG. 6 shows one design category (0°, five phases) of the spatial light modulator patterns and their corresponding illumination patterns at a selected z height according to one embodiment of the present invention.

Refer to FIG. 4, the SLM used in the present embodiment comprises a patterned object 44a, such as a patterned plate, an optical grating, or a liquid crystal SLM, wherein the liquid crystal SLM (LC-SLM) can rapidly change the orientation, phase, and contrast of the structured illumination pattern. The LC-SLM serves as a two-level phase grating. As shown in FIG. 6, the white pixels represent a phase modulation of the liquid crystal at an input gray level whereas the black pixels represent no phase modulation. The upper 5 boxes demonstrate pixels generated by LC-SLM of 0° orientation with 5 different phases $\phi_1$ to $\phi_5$, and the lower boxes show the corresponding illumination patterns observed at the xy focal plane of the objective at a selected z height. The pixels show a period of length 7 and the lateral period of the corresponding illumination patterns is 274 nm. On shifting one pixel (one square) for each SLM pattern, the corresponding illumination patterns shift laterally $4\pi/7$ in phase.

Figure 7:
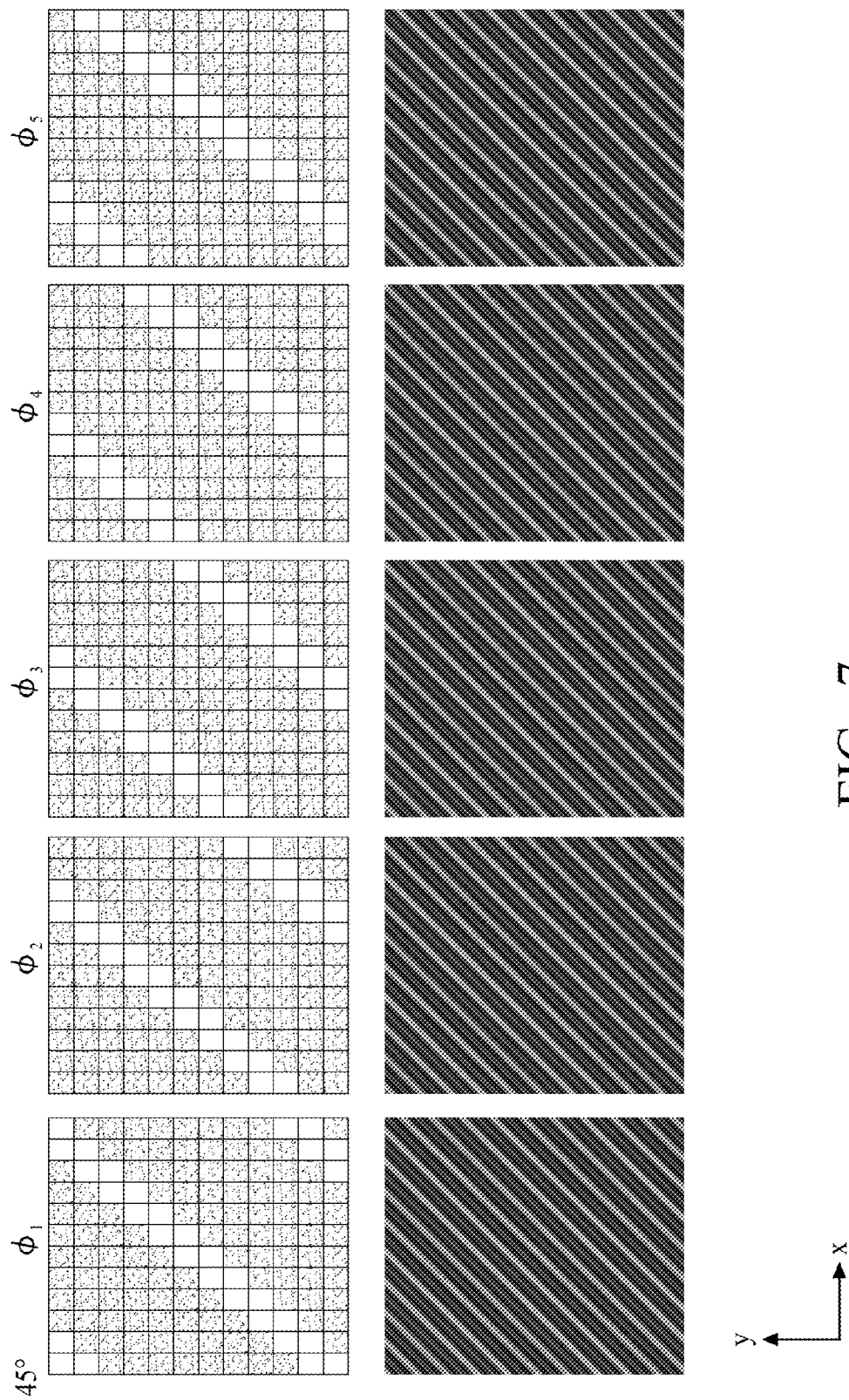
FIG. 7 shows another design category (45°, five phases) of the spatial light modulator patterns and their corresponding illumination patterns at a selected z height according to another embodiment of the present invention.

Similarly, as shown in FIG. 7, the upper boxes demonstrate pixels generated by LC-SLM of 45° orientation with 5 different phases $\phi_1$ to $\phi_5$, and the lower boxes show the corresponding illumination patterns of the xy focal plane of the objective. The pixels show a period of length $5\sqrt{2}$, in diagonal and the lateral period of the corresponding 45° illumination patterns is 277 nm. On shifting one pixel (one square) for each SLM pattern, the corresponding illumination patterns shift laterally $4\pi/5$ in phase.

The periods of lengths 7 and $5\sqrt{2}$ on SLM is designed to have a small difference, ~1%, so that the corresponding illumination patterns have nearly equivalent lateral periods, consequently yielding nearly equal resolution enhancement in the lateral direction. The design in periods can be different, but a large difference would result in the resolution enhancement unequally in various orientations. Moreover, the numbers of white and black pixels or the gray levels of white pixels control the intensity ratios of the zero and first order light. On substituting one black column with one white column in each SLM pattern and by setting 0.875 $\pi$ phase retardation in the white pixels, the light of zero and first order generating structured illumination in all orientations with nearly the same contrast is obtained.

The optical lenses are positioned on the optical path to adjust the lateral periodicity of the structured illumination patterns. Before the diffuser is placed at S2, the distance between the plurality of optical lenses in one embodiment of the present invention is determined by the following criteria:
1) the impinging position of the diffracted beam of +1 and −1 order has to be close to the peripheral of the objective, so that the lateral periodicity of the structured pattern can approach the diffraction limit; and
2) the three diffracted beams should be converged and focused at the back focal plane of the objective such that the structured pattern formed at the conjugate image plane can be observed at the image plane where the sample resides.

Figure 8:
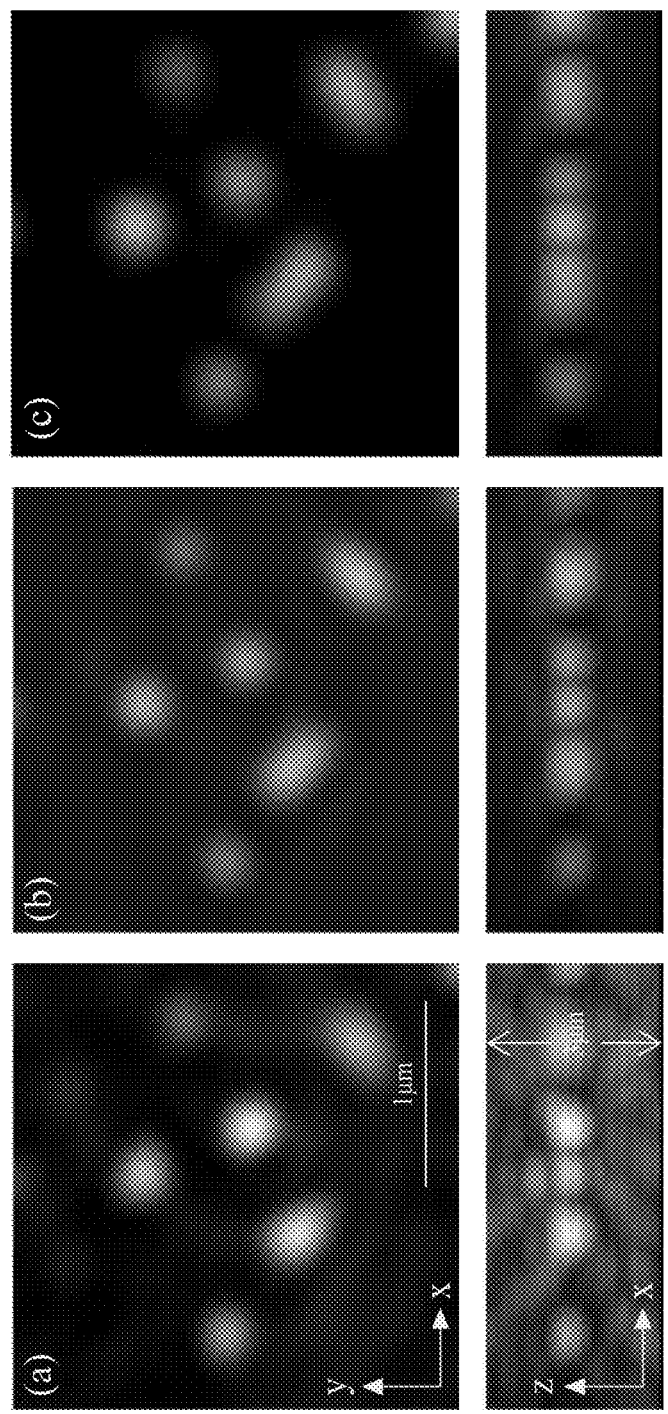
FIG. 8 shows projections of wide-field images of 100 nm gold nanoparticles by the illumination of 0 order diffraction when positioning a rotating diffuser at a) S1, b) S2, and c) halogen light illumination with no diffuser, wherein the upper image is a lateral (xy) projection while the lower image is an axial (xz) projection.

In one embodiment of the present invention, a diffracted beam of 0 order is illuminated on the sample which has 100 nm gold nanoparticles immersed in water on a coverslip to form a wide-field scattered light image. FIG. 8 compares the projected wide-field images between the placement of a rotating holographic diffuser at (a) S1, (b) S2 of FIG. 5 under a coherent laser light source; and (c) no diffuser but under an incoherent halogen light source. The upper images are the lateral projection of plane xy, while the lower images are the axial projection of plane xz. Every axial projection contains a stack of thirty-one images taken by stepping the sample at a step of 100 nm in the z direction. The image in (a) suffers from an axially periodic background that results mainly from the multiple reflections on various interfaces; accordingly, the illumination retains some degree of coherence under (a). In contrast, the background in (b) is negligible, and the image is comparable to that as shown in (c). The effective deterioration of coherence by placing a rotating diffuser at S2 leads to a quasi-incoherent image.

Figure 9:
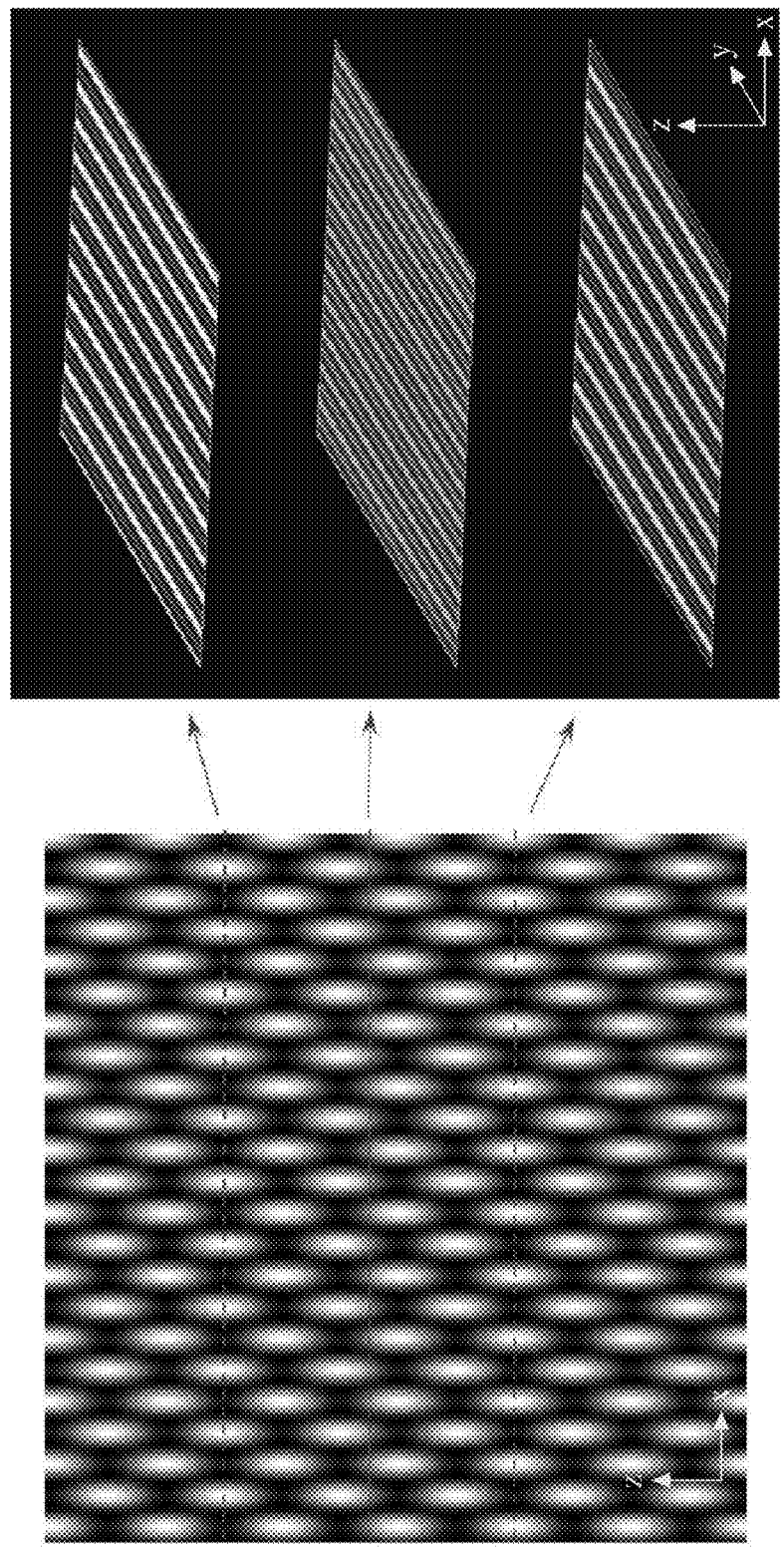
FIG. 9 shows a theoretical simulation of a 0° 3D structured illumination pattern on an xz plane and the corresponding three perspective planes according to different z heights.

FIG. 9 shows a theoretical simulation of a 0° 3D structured illumination pattern on an xz plane (left image) and three perspective planes with respect to different z heights (right images). The 3D structured pattern is formed with three s-polarized coherent light sources so that the contrast of the modulation is maximized. The use of circularly polarized lights reduces the contrast of the modulation but maintains the same periodicity. FIG. 9 demonstrates that the periodicity is not only in the lateral direction but also in the z direction such that the image stack accumulated by sectioning can be carried out in the present embodiment. The PZT stage accommodating the sample accurately steps the position along the z direction through the thickness of the 3D structured pattern, and the signal reflected is then received by CCD for image reconstruction.

Figure 10:
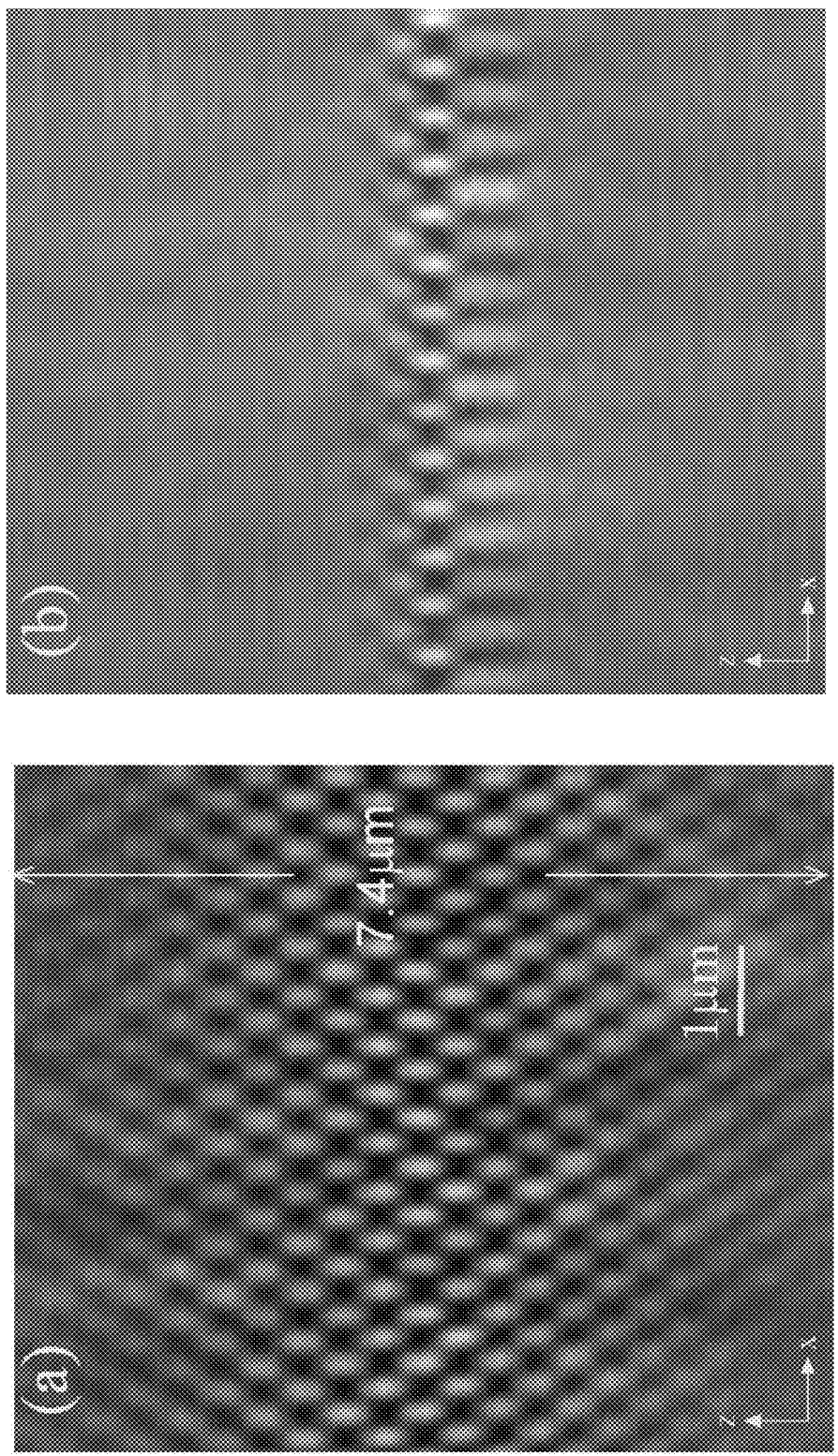
FIG. 10 shows the axial extents of the 3D-structured patterns when positioning a rotating diffuser at a) S1, and b) S2.

FIG. 10 shows the axial extents (xz plane) of the 3D-structured patterns when positioning a rotating diffuser at (a) S1 and (b) S2 of FIG. 5, respectively. In the present embodiment, the images in a stack are taken at z step of 100 nm by placing a silicon wafer on the sample stage, and the structured pattern is formed by the intersection of the diffraction beams of 0, +1, and −1 orders. Without any diffuser on the optical path, the 3D structured pattern has an infinite axial extent as shown in FIG. 9 as the three coherent diffraction beams intersect around the sample focal plane. In contrast, the placement of a rotating diffuser reduces the axial extents in FIG. 10. In FIG. 10(a), the structured pattern has a finite axial extent due to a superposition of the incoherence and coherence of the three diffraction beams around the sample focal plane. In FIG. 10(b), the 3D structured pattern imaged at the sample plane reveals an axial extent comparable to the observable region of the microscope in the z direction. Clearly, placing a diffuser at S2 most effectively destroys the coherence of the coherent laser light and therefore allows the reconstruction of a SI-RLS image using incoherent image processes.

Figure 11:
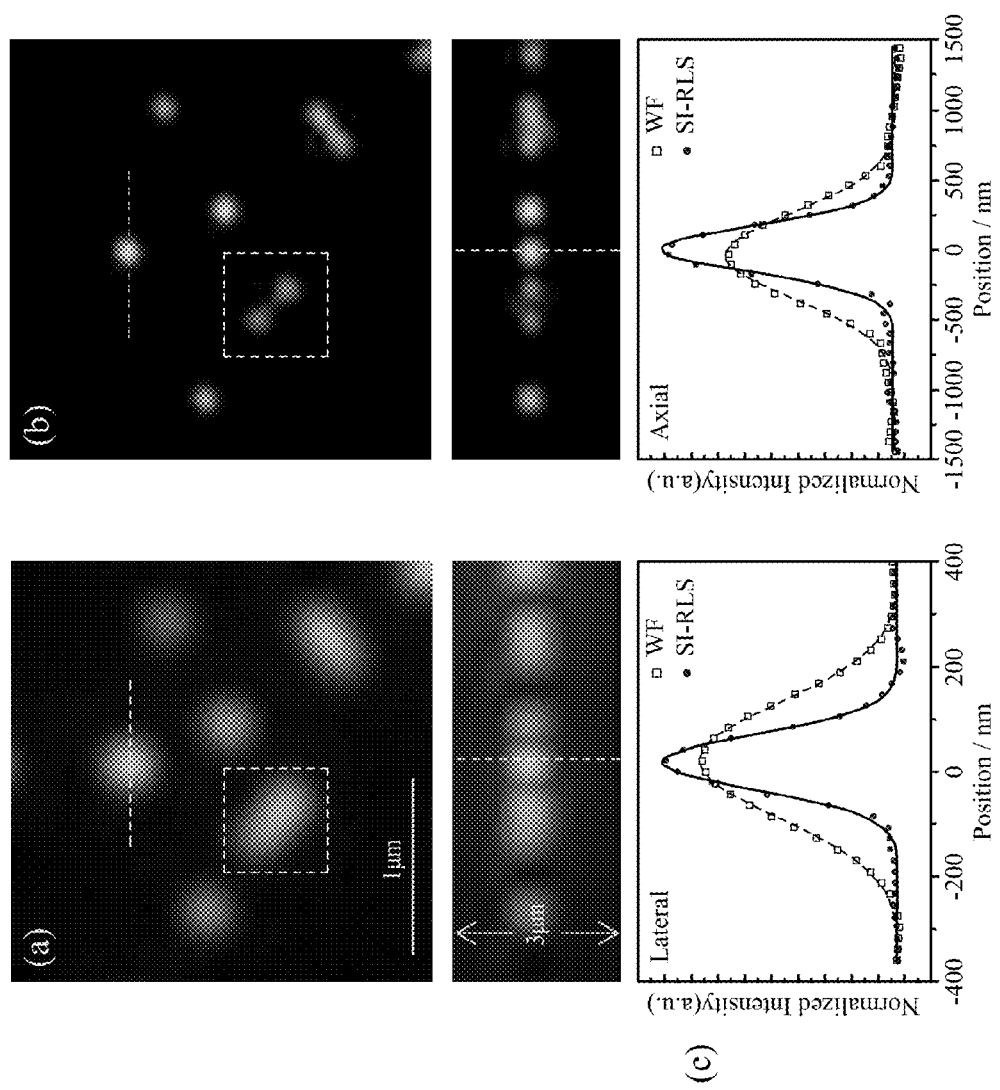
FIG. 11 shows projections of (a) wide-field (WF) and (b) SI-RLS images of 100 nm gold nanoparticles, wherein the upper image is a lateral (xy) projection while the lower image is an axial (xz) projection; (c) lateral and axial profiles of a single gold nanoparticle with a Gaussian fit.

FIG. 11 shows the projections of (a) wide-field and (b) SI-RLS images of 100 nm gold nanoparticles immersed in water on a coverslip, and (c) the lateral and axial profiles of individual gold nanoparticles. The SI-RLS image reveals an improved image contrast and superior resolution in both lateral and axial directions. The average full width at half maximum (FWHM) are 262±6 and 867±19 nm in the lateral and axial directions of the wide-field image. The corresponding FWHM in the SI-RLS image are 117±10 and 428±18 nm, respectively. The resolution is improved by factors of ~2.2 laterally and ~2.0 axially. This improvement is comparable to that in 3D-SIM fluorescence imaging.

Figure 12:
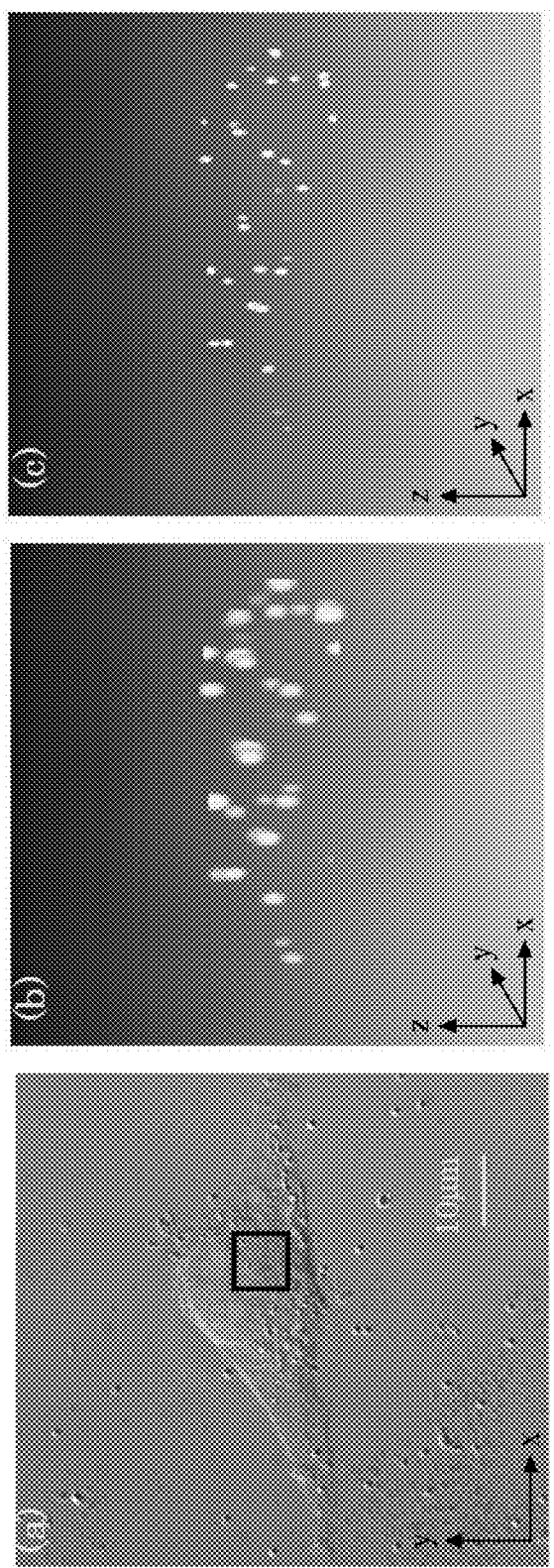
FIG. 12 shows a (a) 2D differential interference contrast image of an internalized HeLa cell; 3D view of a (b) wide-field; and a (c) SI-RLS image of 100 nm gold nanoparticles within the box of (a).

FIG. 12 shows the differential interference contrast image of a HeLa cell. A plurality of 100 nm gold nanoparticles is internalized by the HeLa cell in advance. Within the box shown in FIG. 12(a), a 3D view of the wide field image illuminated with a halogen light source and the SI-RLS image are shown in FIG. 12(b) and FIG. 12(c) for comparison. The SI-RLS image achieves a decreased background and improves the resolution to enable the differentiation of adjacent nanoparticles. FIG. 12 demonstrates the biological applications of the SI-RLS system disclosed in the present invention.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An optical imaging system using incoherent structured illumination, comprising:
   an optical microscope, comprising:
   an objective having a first side facing a sample, a second side opposite to the first side, a front focal plane, and a back focal plane, wherein the front focal plane superimposes the sample;
   a stage placed at the first side of the objective, configured to be moved in a direction toward or away from the objective and to accommodate the sample at the surface of the stage facing the objective;
   a 50/50 beam splitter placed on the optical path to reflect the incident light beams on the second side of the objective and to transmit scattered light from the sample to an imaging recording device;
   a coherent light source emitting coherent light which forms an optical path passing through the objective;
   a spatial light modulator positioned on the optical path and configured to generate a structured pattern from the at the front focal plane of the objective, the spatial light modulator diffracting the coherent light into a plurality of beams with different orders;
   a plurality of optical lenses disposed on the optical path, wherein at least one conjugate image plane of the structured pattern is formed on the optical path by the optical lenses; and
   a rotating diffuser configured to destroy the coherence of the coherent light, disposed at a plane where the plurality of beams with different orders intersect.

2. The system of claim 1, further comprising a quarter wave plate positioned on the optical path.

3. The system of claim 1, further comprises a charge-coupled device camera placed at the second side of the objective, configured to receive light scattered from the sample.

4. The system of claim 1, wherein the spatial light modulator comprises a patterned object, an optical grating, or a liquid crystal spatial light modulator.

5. The system of claim 4, wherein the spatial light modulator comprises a plurality of pixels, and a portion of the pixels are controlled to shift the phase of the incident light beam.

6. The system of claim 4, wherein the spatial light modulator is configured to generate at least 0, +1, and −1 order diffracted beams from the coherent light source.

7. The system of claim 4, wherein the structured illumination pattern is formed from an intersection of a plurality of light beams or a projection from the illumination of a patterned object.

8. The system of claim 4, wherein the spatial light modulator alters the phase and orientation of the structured pattern.

9. The system of claim 4, wherein the structured patterns with different orientations have substantially identical periodicity.

10. The system of claim 1, wherein the structured pattern comprises two dimensional or three dimensional patterns.

11. The system of claim 1, wherein the plurality of lenses is arranged in specific positions such that at least one conjugate image plane where three diffracted beams intersect is formed on the optical path.

12. The system of claim 1, wherein the plurality of lenses is arranged in specific positions such that the +1 and −1 order diffracted beams from the spatial light modulator are close to the edge of the objective.

13. The system of claim 12, wherein the plurality of lenses is arranged in specific positions such that the diffracted beams of the spatial light modulator are focused on the back focal plane of the objective.

14. The system of claim 1, wherein the rotating diffuser comprises a plate or a ground glass which transmits light from the light source and has a roughened surface or an optical coating on the surface to destroy the light coherence.

15. The system of claim 14, wherein the diffuser rotates 360 degrees continuously around the axis of the optical path.

16. The system of claim 14, wherein the diffuser vibrates continuously around the axis of the optical path.

17. The system of claim 1, wherein the stage is controlled by a piezoelectric transducer to move in the direction toward or away from the objective.

18. An optical system generating incoherent structured illumination, the system comprising:
   a coherent light source outputting coherent light which forms an optical path;
   a spatial light modulator positioned on the optical path and receiving the coherent light, wherein the spatial light modulator generates a plurality of diffracted coherent light beams with different orders and is configured to form a structured pattern where the light beams intersect;
   a plurality of optical lenses positioned on the optical path and forming at least one conjugate image plane where the plurality of diffracted coherent light beams intersect;
   a rotating diffuser positioned on one of the conjugate image planes which is a plane where the plurality of beams with different orders intersect, configured to destroy the coherence of the diffracted coherent light beams;

an objective receiving the plurality of diffracted light beams with destroyed coherence; and a stage next to the objective, accommodating a sample and positioned at the front focal plane of the objectives wherein the rotating diffuser is disposed at a lower stream of the optical path compared to a position of the spatial light modulator.

19. The system of claim 18, wherein the spatial light modulator comprises a patterned object, an optical grating, or a liquid crystal spatial light modulator.

20. The system of claim 19, wherein the structured pattern is formed from an intersection of a plurality of light beams or a projection from the illumination of a patterned object.

21. The optical system of claim 18, wherein the spatial light modulator generates at least 0, +1, and −1 order diffracted beams from the coherent light source.

22. The optical system of claim 18, wherein the rotating diffuser comprises a plate or a ground glass which transmits light from the light source and has a roughened surface or an optical coating on the surface to destroy the light coherence.

23. The optical system of claim 22, wherein the diffuser rotates 360 degrees continuously around the axis of the optical path.

24. The optical system of claim 22, wherein the diffuser vibrates continuously around the axis of the optical path.

25. The optical system of claim 18, wherein the structured pattern comprises two dimensional or three dimensional patterns.

26. The optical system of claim 18, wherein the plurality of optical lenses are arranged in specific positions such that the +1 and −1 order diffracted beams from the spatial light modulator are close to the edge of the objective.

27. The optical system of claim 26, wherein the plurality of lenses are arranged in specific positions such that the diffracted beams from the spatial light modulator are focused on the back focal plane of the objective.

* * * * *